United States Patent
Dames

[19]

[11] Patent Number: 6,124,708

[45] Date of Patent: Sep. 26, 2000

[54] POSITION DETECTION USING A SPACED APART ARRAY OF MAGNETIC FIELD GENERATORS AND PLURAL SENSING LOOP CIRCUITS OFFSET FROM ONE ANOTHER IN THE MEASUREMENT DIRECTION

[75] Inventor: Andrew N. Dames, Cambridge, United Kingdom

[73] Assignee: Absolute Sensors Limited, Cambridgeshire, United Kingdom

[21] Appl. No.: 09/077,108

[22] PCT Filed: Nov. 25, 1996

[86] PCT No.: PCT/GB96/02896

§ 371 Date: Sep. 25, 1998

§ 102(e) Date: Sep. 25, 1998

[87] PCT Pub. No.: WO97/19323

PCT Pub. Date: May 29, 1997

[30] Foreign Application Priority Data

Nov. 23, 1995 [GB] United Kingdom .................... 9523991

[51] Int. Cl.[7] ............................... G01B 7/02; G01B 7/14; G01D 5/20; G08C 19/06
[52] U.S. Cl. ................................ 324/207.12; 324/207.17; 324/207.24; 336/45; 340/870.32
[58] Field of Search ........... 324/207.12, 207.17–207.19, 324/207.24; 336/130, 131, 45; 340/870.32, 870.33, 870.35, 870.36; 341/15

[56] References Cited

U.S. PATENT DOCUMENTS

| | | |
|---|---|---|
| 3,772,587 | 11/1973 | Farrand et al. . |
| 4,014,015 | 3/1977 | Gundlach ........................ 324/207.16 X |
| 4,820,961 | 4/1989 | McMullin . |
| 4,893,077 | 1/1990 | Auchterlonie ..................... 324/207.17 |

FOREIGN PATENT DOCUMENTS

| | | |
|---|---|---|
| 0182085 A3 | 5/1986 | European Pat. Off. . |
| WO 95/31696 | 11/1995 | WIPO . |

OTHER PUBLICATIONS

Electronics Letters, vol. 11, No. 1, Jan. 9, 1975, pp. 5–6, Gordon, "Digital xy position indicator using walsh functions".

*Primary Examiner*—Gerard Strecker
*Attorney, Agent, or Firm*—Nixon & Vanderhye P.C.

[57] ABSTRACT

A sensor head is provided for use in a apparatus for indicating the position of a movable member relative to a fixed member. It has two multi-turn sensor windings, each including repetitive pattern of series connected alternate sense loops of conductor. One sensor winding is in spatial phase quadrature with the other sensor winding, and the arrangement of the windings is such that the mid points of the sensor windings coincide. The sensor head is particularly suited for use in indicating the position of a movable member relative to a fixed member as it is relatively insensitive to longitudinal tilt relative to the other member.

50 Claims, 13 Drawing Sheets

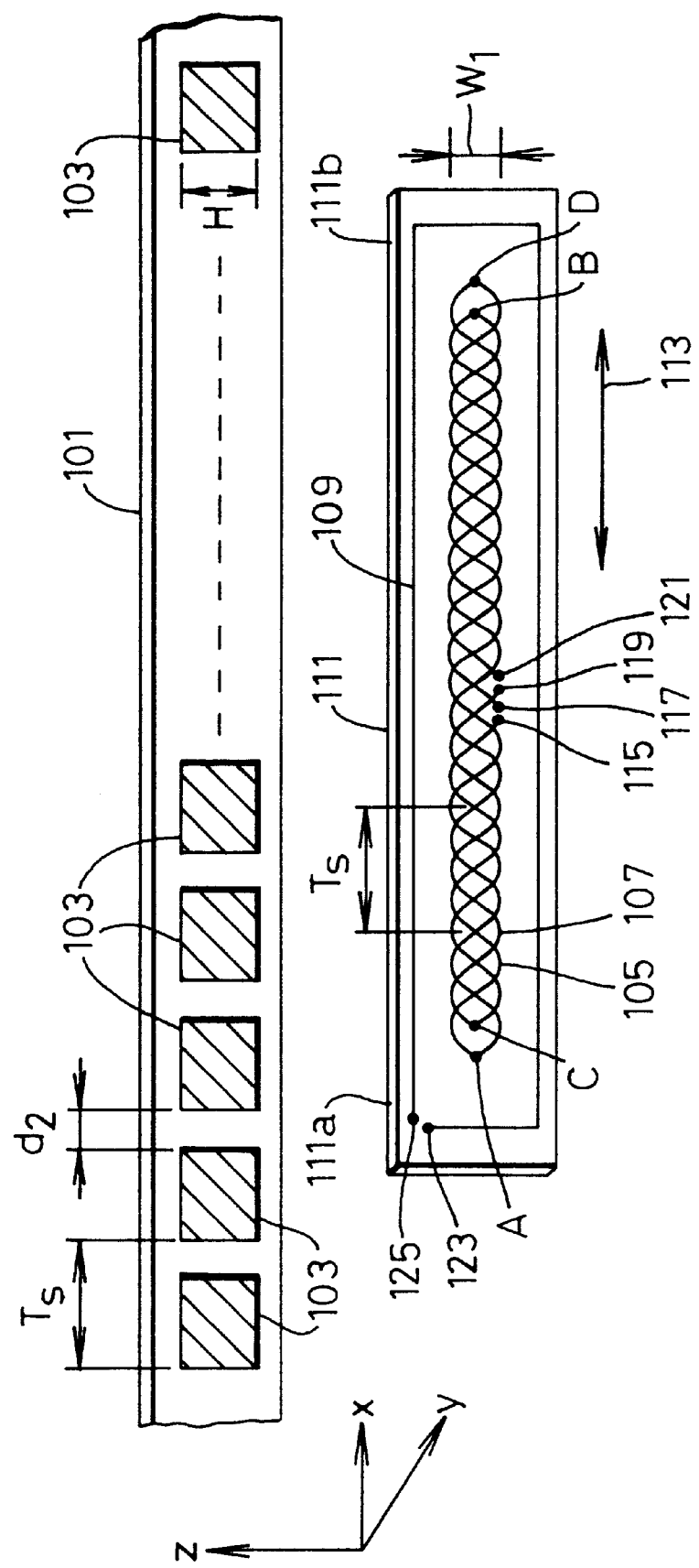

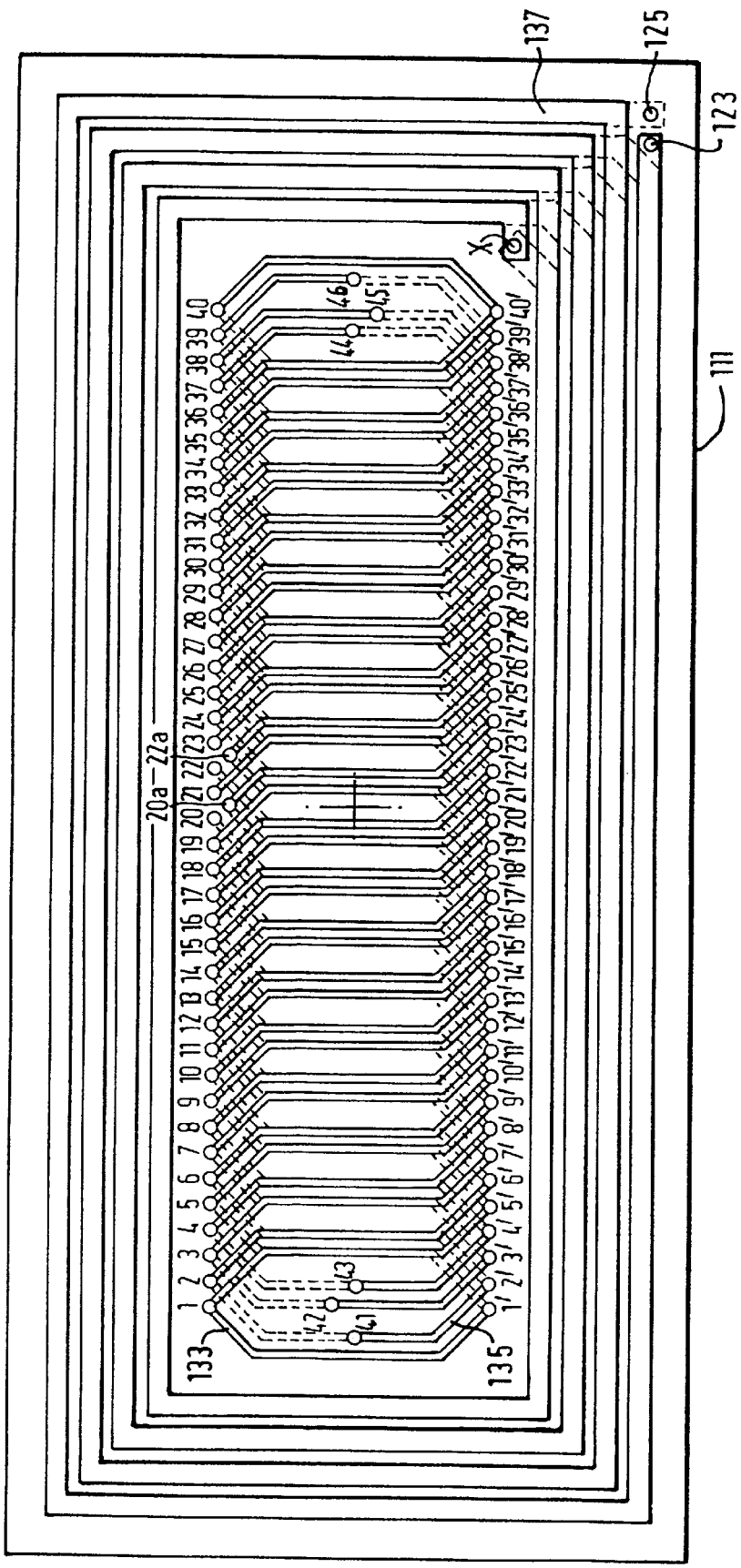

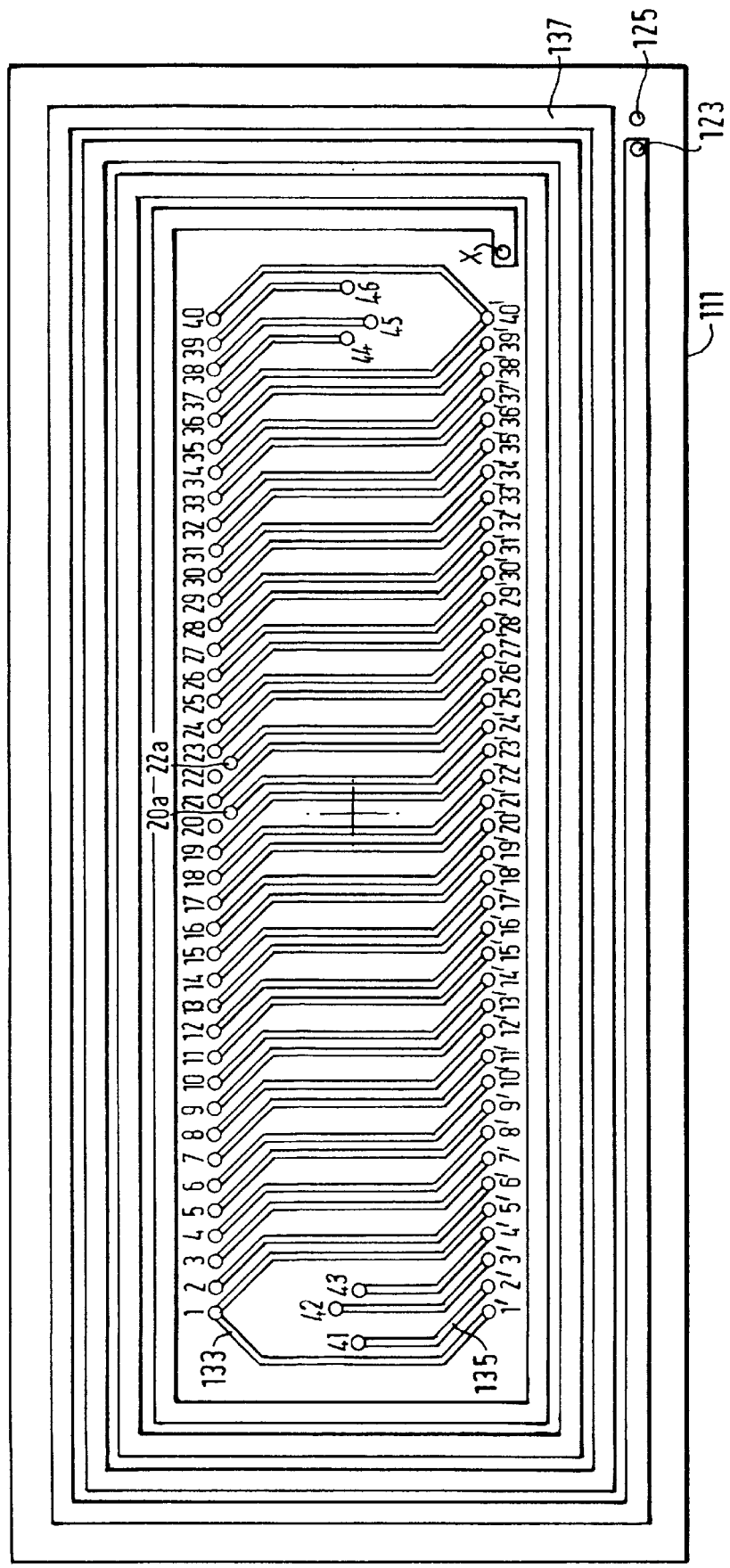

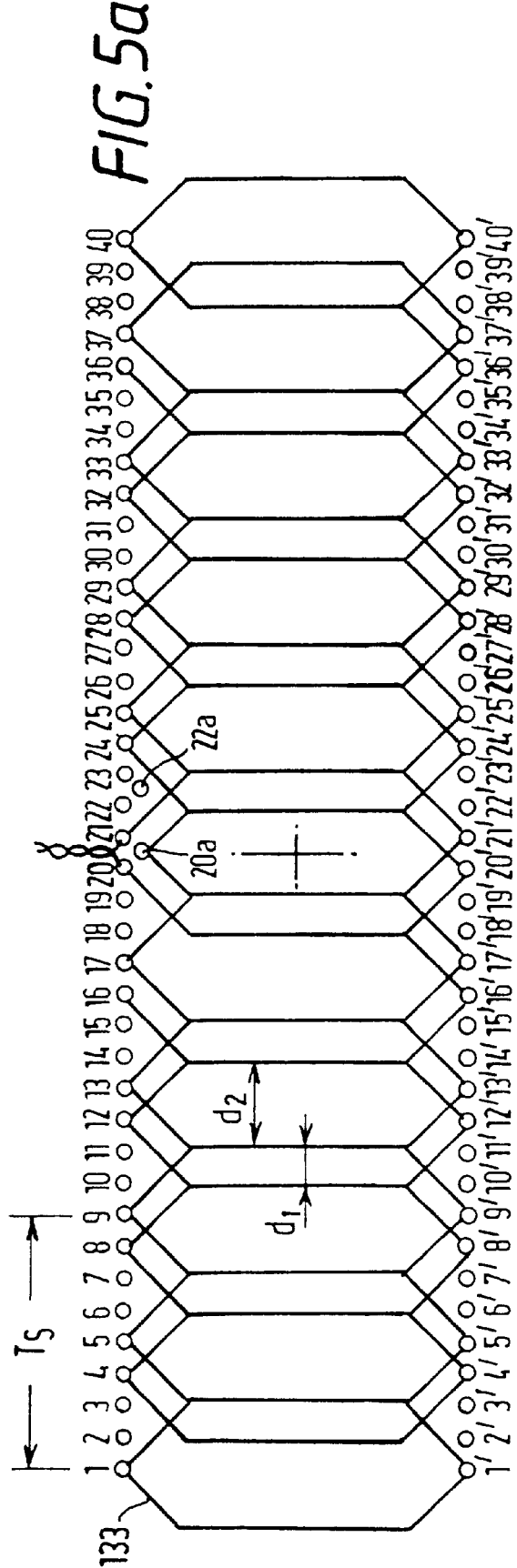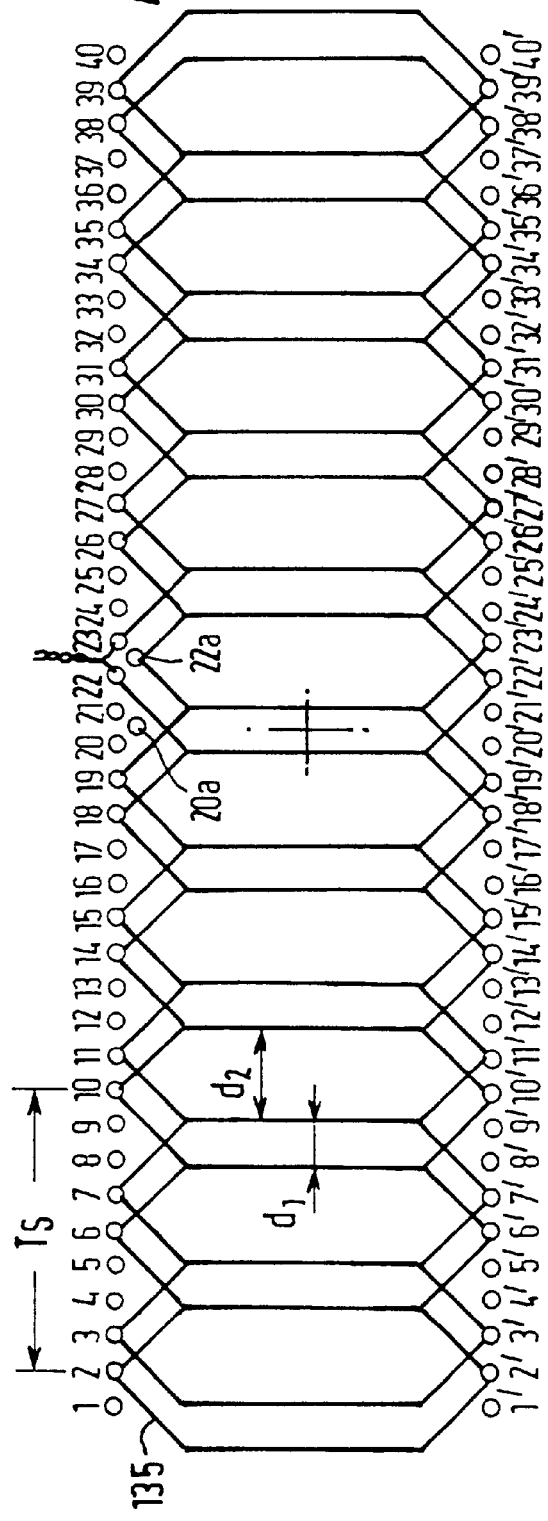

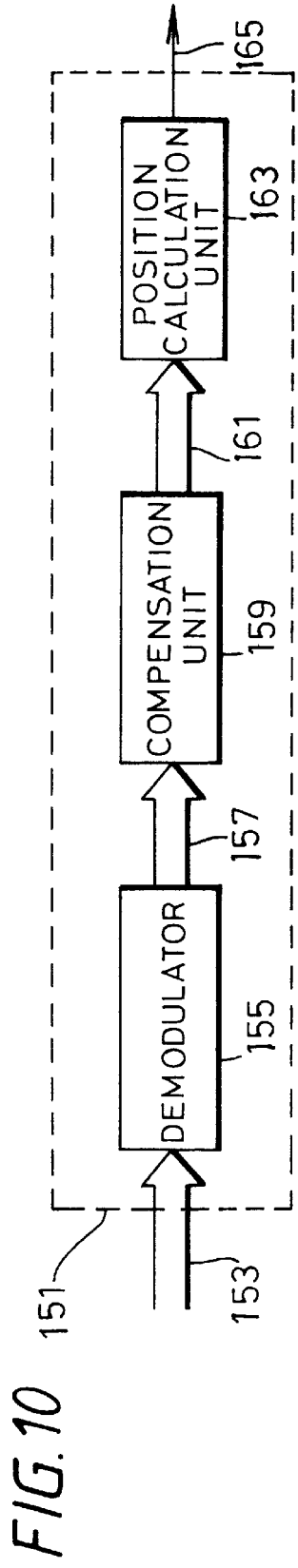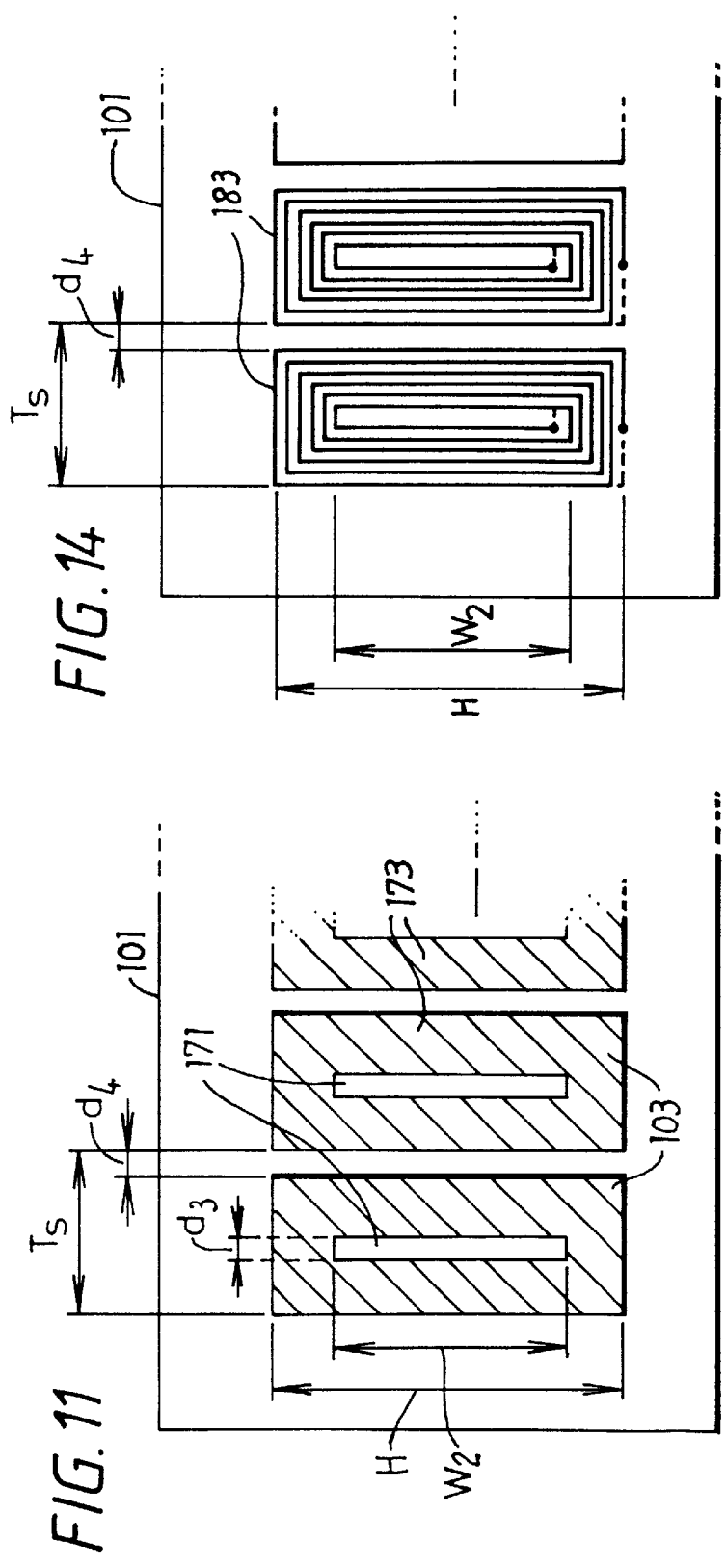

POSITION DETECTION USING A SPACED APART ARRAY OF MAGNETIC FIELD GENERATORS AND PLURAL SENSING LOOP CIRCUITS OFFSET FROM ONE ANOTHER IN THE MEASUREMENT DIRECTION

BACKGROUND OF THE INVENTION

1. Field of the Invention

The present invention relates to position encoders generally. The invention has particular although not exclusive relevance to non-contact linear position encoders.

2. Related Art

Many types of non-contact linear position sensors have been proposed. In particular, EP 0182085 discloses a non-contact position sensor which employs an excitation winding and one or more pick-up windings mounted on the surface of a stationary element, and a conductive screen mounted on a movable element. A homogenous a.c. magnetic field is established in the vicinity of the pick-up winding by passing a current through a generally planar excitation winding. The pick-up winding, normally consisting of one turn, starts at one end of the stationary element and follows a sinuous path therealong until it reaches the other end, where it turns back along the support following a sinuous path to the starting end. The sinusoidal forward and return conduction paths that form the pick-up winding are substantially 180° out of phase. Therefore, the pick-up winding comprises a series of alternating sense conduction loops, each arranged to enclose a similar area.

If the area enclosed by each loop of the pick-up winding is identical, and there is a homogenous excitation drive field over the length of the pick-up winding then, in the absence of the conductive screen, there will be no net output from the pick-up winding. However, when the conductive screen is provided adjacent the pick-up winding the homogenous field generated by the current flowing in the excitation winding induces eddy currents in the conductive screen. These eddy currents establish a counter-field opposing the forward homogenous field. This opposing field alters the balance between the excitation winding and the pick-up winding and a net output EMF in the pick-up winding results, the magnitude of which is dependent upon the position of the conductive screen within a period of the pick-up winding. In particular, the peak amplitude of the output signal from the pick-up winding varies in a sinusoidal manner with the position of the conductive screen along the pick-up winding.

In order to determine the position of the conductive screen within a whole period of the pick-up winding, a second pick-up winding is provided which is in spatial phase quadrature with the first pick-up winding. With this arrangement two phase quadrature signals are generated, from which the position of the conductive screen within a period of the pick-up winding can be determined, independent of the amplitudes of the signals. Additionally, if the absolute position of the conductive screen is to be determined, then either a counter must be provided for counting the number of periods that have passed from a reference point or an additional coarse position encoder must be provided.

The present applicant has proposed in International Application WO95/01095 a similar position sensor, which employs a resonant circuit instead of the conductive screen. By using a resonant circuit the output signal levels are increased and the system can be operated in a pulse-echo mode of operation, i.e. applying a short burst of excitation current to the excitation winding and then detecting and processing the signal induced in the pick-up windings, after the burst of excitation current has ended. Pulse-echo operation is possible because the resonant circuit continues to "ring" for a short period of time after the excitation current has been removed. This offers the advantage of ensuring that there is no unwanted cross-coupling between the excitation winding and the pick-up windings.

Although use of a resonant circuit in the position sensor allows a pulse-echo mode of operation, this is not essential. When the resonant circuit is resonating, its impedance is purely resistive. Consequently, the electrical phase of the output signal with respect to the drive voltage is well defined, and the desired output signal can be isolated from any unwanted cross-coupling signal by synchronously detecting the signals on the pick-up windings at the appropriate phase. In contrast, when a conductive screen is used, the eddy currents induced in the conductive screen will include a resistive component and an inductive component which may be difficult to define.

A problem with the position sensors described in EP 0182085 and WO95/01095 is that when there is a large measuring distance and when a high resolution of position measurement is required, a large excitation loop must be energised. For example, if the measurement range is 50 meters then the area enclosed by the excitation winding must be 50 meters long to enable the system to work properly. Energising this amount of area results in a large amount of radiated interference. Additionally, the longer pick-up windings are more sensitive to unwanted electromagnetic interference.

U.S. Pat. No. 4,820,961 solves the above problem by using a passive strip of spaced conductive shields mounted on the stationary element, and a sensor head, comprising the excitation winding and the pick-up windings, mounted on the movable element. In particular, U.S. Pat. No. 4,820,961 discloses a non-contact linear position sensor for determining the position of a moveable vehicle along a fixed track. Along the track there are a plurality of equally spaced conductive shields, and drive and pick-up windings are provided on the vehicle. As the vehicle moves along adjacent the track, output signals are induced in the pick-up windings from which the position of the vehicle can be determined.

However, the system disclosed in U.S. Pat. No. 4,820,961 is not suitable for more accurate position sensing systems, as for example position sensing systems used in the positioning of machine tools, where position sensing accuracy is typically required to be better than 20 µm, because the system is relatively sensitive to pitch and roll of the sensor head relative to the track.

SUMMARY OF THE INVENTION

According to one aspect, the present invention provides a sensor head for use in an apparatus for indicating the position of a movable member relative to a fixed member, the sensor head comprising: at least two sensor windings, mounted on the sensor head, each comprising at least one period of series connected alternate sense loops of conductor, wherein each sensor winding is spatially separated in the measurement direction and wherein the arrangement of the multi-turn sensor windings is such that their respective mid-points substantially coincide. Such a configuration of sensor head is advantageous in that it is less sensitive to longitudinal tilt of the sensor head relative to the other member.

Each sensor winding can be defined by conductors on a plurality of layers of a printed circuit board. This has the advantage of reduced manufacturing cost. Preferably, the sensor windings are defined by two complementary repetitive patterns of conductors mounted on two sides of the printed circuit board, and wherein each side of the printed circuit board carries a portion of each repetitive pattern. With this arrangement, the sensitivity of the position encoder to roll of the sensor head relative to the fixed track is reduced.

An embodiment of the present invention provides an apparatus for indicating the position of a movable member relative to a fixed member, comprising: a plurality of magnetic field responsive elements equally spaced along the fixed member; and a sensor head as described above, mounted for movement with the movable member, and arranged such that when the magnetic field responsive elements are energised, signals are induced in the sensor windings which are dependent upon the position of the movable member relative to the fixed member. Preferably, the magnetic field responsive elements are resonant circuits, as this allows a pulse-echo mode of operation.

BRIEF DESCRIPTION OF THE DRAWINGS

Exemplary embodiments of the present invention will now be described, with reference to the accompanying drawings in which:

FIG. 1 is a schematic view of a linear position sensor suggested in the prior art;

FIG. 4a schematically illustrates a sensor head embodying the present invention having two phase quadrature pick-up windings, which comprise series connected alternate sense hexagonal shaped loops;

FIG. 4b shows a first layer of printed conductors which forms part of the sensor head shown in FIG. 4a;

FIG. 4c shows a second layer of printed conductors which forms part of the sensor head shown in FIG. 4a;

FIG. 5a schematically illustrates the form of a first winding forming part of the sensor head shown in FIG. 4a;

FIG. 5b schematically illustrates the form of a second winding forming part of the sensor head shown in FIG. 4a which is in spatial phase quadrature with the winding shown in FIG. 5a;

FIG. 6 is a plot of the surface current density on some of the conductors of one of the windings on the sensor head shown in FIG. 4a;

FIG. 7a schematically illustrates the pattern of conductors forming a first part of the sensor head shown in FIG. 4a;

FIG. 7b schematically illustrates the pattern of conductors forming a second part of the sensor head shown in FIG. 4a;

FIG. 7c schematically illustrates the pattern of conductors forming a third part of the sensor head shown in FIG. 4a;

FIG. 7d schematically illustrates the pattern of conductors forming a final part of the sensor head shown in FIG. 4a;

FIG. 9b shows a second layer of printed conductors which forms part of the sensor head according to the second embodiment, which when superimposed on or under the layer shown in FIG. 9a, forms a preferred form of sensor head similar to the sensor head shown in FIG. 4a;

FIG. 10 is a block diagram illustrating the components of processing circuitry used in one embodiment to determine the position of the sensor head relative to the track;

FIG. 11 shows the end of a track used in a positional encoder of an alternative embodiment, where the conductive screens have a rectangular slit provided in a central portion thereof;

FIG. 12b is a plot of the magnetic field generated at the surface of the conductive screens shown in FIG. 12a;

FIGS. 13b and 13c are layers of printed conductors which form the coil of the resonant circuits shown in FIG. 13a; and FIG. 14 shows the end of a track used in a positional encoder of an alternative embodiment, where the conductive screens are replaced by short circuit coils.

BRIEF DESCRIPTION OF EXEMPLARY EMBODIMENTS

Figure 2A:
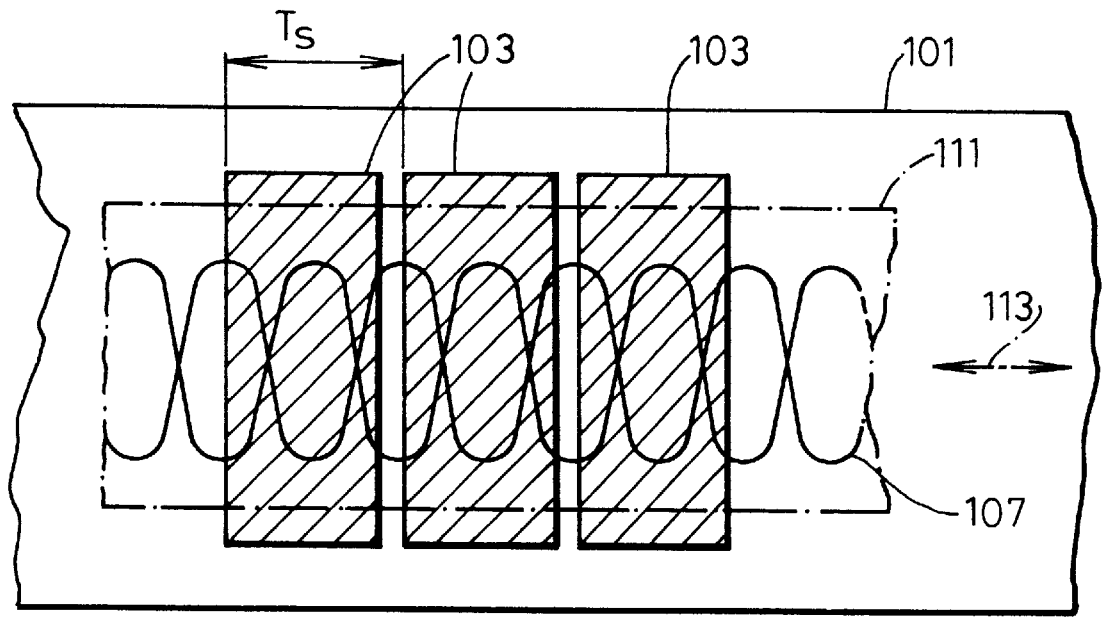
FIG. 2a schematically shows part of a track and part of a sensor head which are used in the position encoder shown in FIG. 1.

FIG. 1 is a schematic view of a linear position sensor suggested in the prior art. As shown in FIG. 1, the track 101 carries a plurality of equally spaced conductive screens 103 made from, for example, copper. FIG. 1 also shows a pair conductive pick-up windings 105 and 107 in spatial phase quadrature and an excitation winding 109 mounted on a sensor head 111. For best results, the height H of the conductive screens 103 should be greater than the peak width $W_1$ of the pick-up windings 105 and 107. As represented by arrow 113, the sensor head 111 is free to move along the length of the track 101, i.e. parallel to the x-axis of FIG. 1. The track 101 is arranged to lie in a plane that is parallel to the plane in which the sensor head 111 can move, as this provides the greatest magnetic coupling between the pick-up windings 105 and 107 and the conductive screens 103.

The pick-up windings 105 and 107 are formed as conductive patterns on a printed circuit board, and are insulated from each other by using both sides of the printed circuit board and via holes. Pick-up winding 105 extends from point A at end 111a of the sensor head 111 and follows a sinuous path therealong until it reaches point B at the other end 111b, where it returns back along the sensor head 111 following a sinuous path to the starting point A. Similarly, pick-up winding 107 extends from point C at end 111a of the sensor head 111 and follows a sinuous path therealong until it reaches point D at the other end 111b, where it returns back along the sensor head 111 following a sinuous path to the starting point C. The sinusoidal forward and return conduction paths that form each pick-up winding 105 and 107 are substantially 180° out of phase. Provided each winding 105 and 107 extends along the sensor head 111 for a whole number of periods $T_s$, then each winding 105 and 107 will be relatively insensitve to background electromagnetic interference. This is because each winding 105 and 107 comprises an equal number of alternate sense loops, ie. an equal number of loops wound clockwise and anticlockwise. Therefore any EMF induced in loops wound clockwise from background electromagnetic interference will cancel with the EMF induced in the loops which are wound anticlockwise. Therefore, the windings 105 and 107 are said to be balanced.

The spatial period of the pick-up windings 105 and 107 and the repetition period of the conductive screens 103 should be substantially the same, so that the position of each screen within a period of a pick-up winding is substantially the same. Consequently, the signals induced in the pick-up windings 105 and 107 by each conductive screen 103 will all depend upon the same position and will add to give a stronger output signal.

The configuration of the excitation winding 109 is designed to generate, upon excitation, a homogenous magnetic field along the x-axis for a fixed sensor head position in the Z and Y planes. The excitation winding 109 starts at end 111a of the sensor head 111 and extends around the periphery of the sensor head 111 until it returns to end 111a. The ends 115,117,119 and 121 of the pick-up windings 105 and 107 and the ends 123 and 125 of the excitation winding 109 are connected to an excitation and processing unit (not shown), which produces the excitation signal and processes the signals on the pickup windings to determine the position of the sensor head 111 relative to the track 101.

Figure 2B:
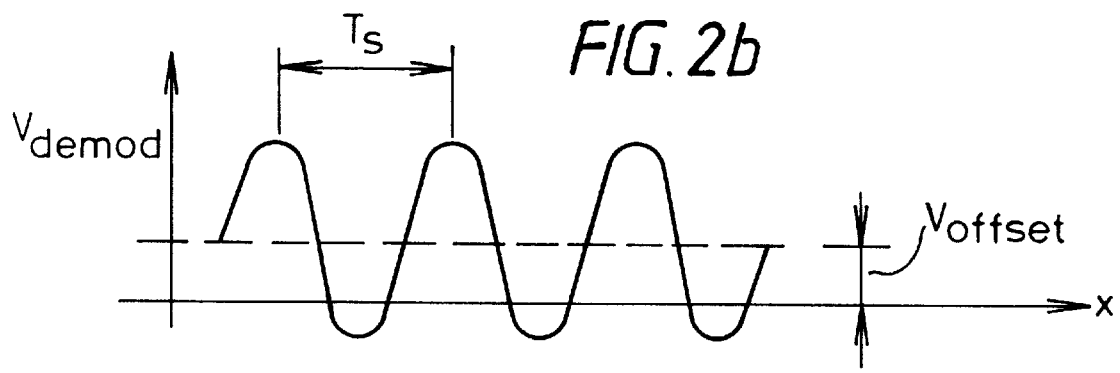
FIG. 2b shows the way in which a demodulated output signal from a pick-up winding mounted on the sensor head varies as a function of the position of the sensor head relative to the track.

The operation of the sensor system shown in FIG. 1 will now be briefly described with reference to FIGS. 2a and 2b. FIG. 2a shows three of the conductive screens 103 which are mounted on the track 101 and a portion of one of the pick-up windings 107. FIG. 2b shows the way in which the demodulated output signal on pick-up winding 107 varies, as a function of the position (x) of the sensor head 111 along the track 101, when an excitation current is applied to the excitation winding (109 shown in FIG. 1). The maximum demodulated output signal occurs when the centres of the conductive screens 103 coincide with the largest separation of the forward and return conductor paths of winding 107, and the minimum occurs when the centres of the conductive screens 103 coincide with the crossover points of the forward and return conduction paths of winding 107.

When the position of the sensor head 111 along the x-axis relative to the track 101 is to be determined, an excitation current is applied to the excitation loop (109 shown in FIG. 1). The excitation current induces eddy currents to flow within the conductive screens 103 which are adjacent to the excitation winding. The induced eddy currents establish a counter-field opposing the excitation field. This counter-field is sensed by the pick-up windings 105 and 107, and phase quadrature output signals are generated whose peak amplitudes vary (as shown in FIG. 2b) in a sinusoidal manner as the sensor head 111 moves along the x-axis relative to the track 101. Therefore, by taking the arc-tangent of the ratio of the signals induced in the pick-up windings 105 and 107, the position of the sensor head 111 within the repetition period of the conductive screens 103 can be determined. To determine the absolute position of the sensor head 111 along the entire length of the track 101, a counter is provided in the excitation and processing circuitry (not shown) which counts the passing conductive screens 103. A more detailed explanation of the way in which a system similar to the one shown in FIG. 1 operates, can be found in EP 0182085 and U.S. Pat. No. 4,820,961 the contents of which are incorporated herein by reference.

The inventors have identified a problem with the non-contact position sensor illustrated in FIG. 1 which makes it unsuitable for high accuracy applications, such as machine tool applications which require an accuracy of better than 20 $\mu$m. In particular, the inventors have noted that if the sensor head 111 tilts in the X-Y plane of FIG. 1, then a positional error occurs in the output signals. The reason for this error will now be described with reference to FIGS. 1 and 3.

Figure 3:
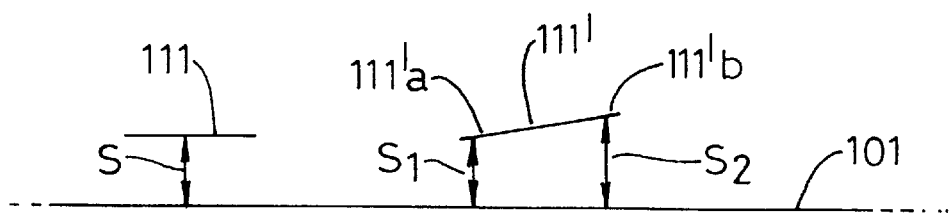
FIG. 3 schematically illustrates the track and, on the left hand side, a sensor head in an ideal position lying in a plane parallel to the plane of the track and, on the right hand side, a sensor head which is tilted relative to the track.

FIG. 3 schematically illustrates the track 101 and, on the left hand side, a sensor head 111 in an ideal position lying in a plane parallel to the plane of the track 103 and, on the right hand side, a sensor head 111' which is tilted relative to the track 101. When the sensor head 111 lies in a plane parallel to the plane of the track 101, the separation S between the pick-up windings mounted on the sensor head 111 and the conductive screens mounted on the track 101 will be the same for all points along the sensor head 111. However, when the sensor head 111' is tilted relative to the track 101, as shown, the separation $S_1$ between end 111'a of the sensor head 111' and the track 101 is smaller than the separation $S_2$ between end 111b of the sensor head 111' and the track 101. Consequently, those parts of the pick-up windings 105 and 107 which are closer to the track 101 will pick-up more signal than those parts of the pick-up windings 105 and 107 which are further away.

Referring to FIG. 1, since the pick-up windings 105 and 107 are spatially separated by a quarter of a period $T_s$ their mid-points will likewise be separated by quarter of a period. As a result, when the sensor head 111' is tilted, for example about the mid-point of pick-up winding 105, half of winding 105 will be closer to the track and half will be further away, whereas less than half of winding 107 will be closer to the track and more than half will be further away. Therefore, the output signals from each winding 105 and 107 will be affected in a slightly different manner. Consequently, when the processing circuitry performs the ratio-metric calculation to determine the position of the sensor head 111 relative to the track 101 a positional error occurs.

The present embodiment aims to reduce this positional error which results from tilt of the sensor head 111 relative to the track 101, by using pick-up windings whose effective mid points coincide. Preferably each winding is generally symmetric about the mid point, such that the windings longitudinally to the left of the mid point are substantially a mirror image of the windings longitudinally to the right of the mid point.

FIG. 4a schematically illustrates a sensor head 111 having pick-up windings 133 and 135, each comprising five periods of series connected alternate sense hexagonal shaped loops of conductor. In this embodiment, the period ($T_s$) is equal to 6 mm and winding 135 is quarter of a period out of phase with winding 133. However, as will be described in more detail below, the windings 133 and 135 have the same mid points (represented by the cross in the centre of the windings) on the sensor head 111. The pick-up windings 133 and 135 are formed by conductive patterns on two sides of a printed circuit board. The conductors on the top layer are represented by unbroken lines, whereas those on the bottom layer are represented by broken lines. The conductors on both sides of the printed circuit board are connected where appropriate at via holes 1-46,1'-40',20a and 22a. In this embodiment, the connection points for connecting the pick-up windings 133 and 135 to the excitation and processing circuitry (not shown) are provided at vias 20 and 21 for pick-up winding 133 and 22 and 23 for pick-up winding 135.

As shown in FIG. 4a, in this embodiment, the excitation winding 137 extends around the periphery of the circuit board from the connection point 123 in a decreasing clockwise spiral for four turns until via hole X, where it passes to the other side of the circuit board and then extends clockwise in an increasing spiral for four turns to the connection point 125. The connection points 123 and 125 are provided for connecting the excitation winding 137 to the excitation and processing circuitry (not shown).

Figure 4C:
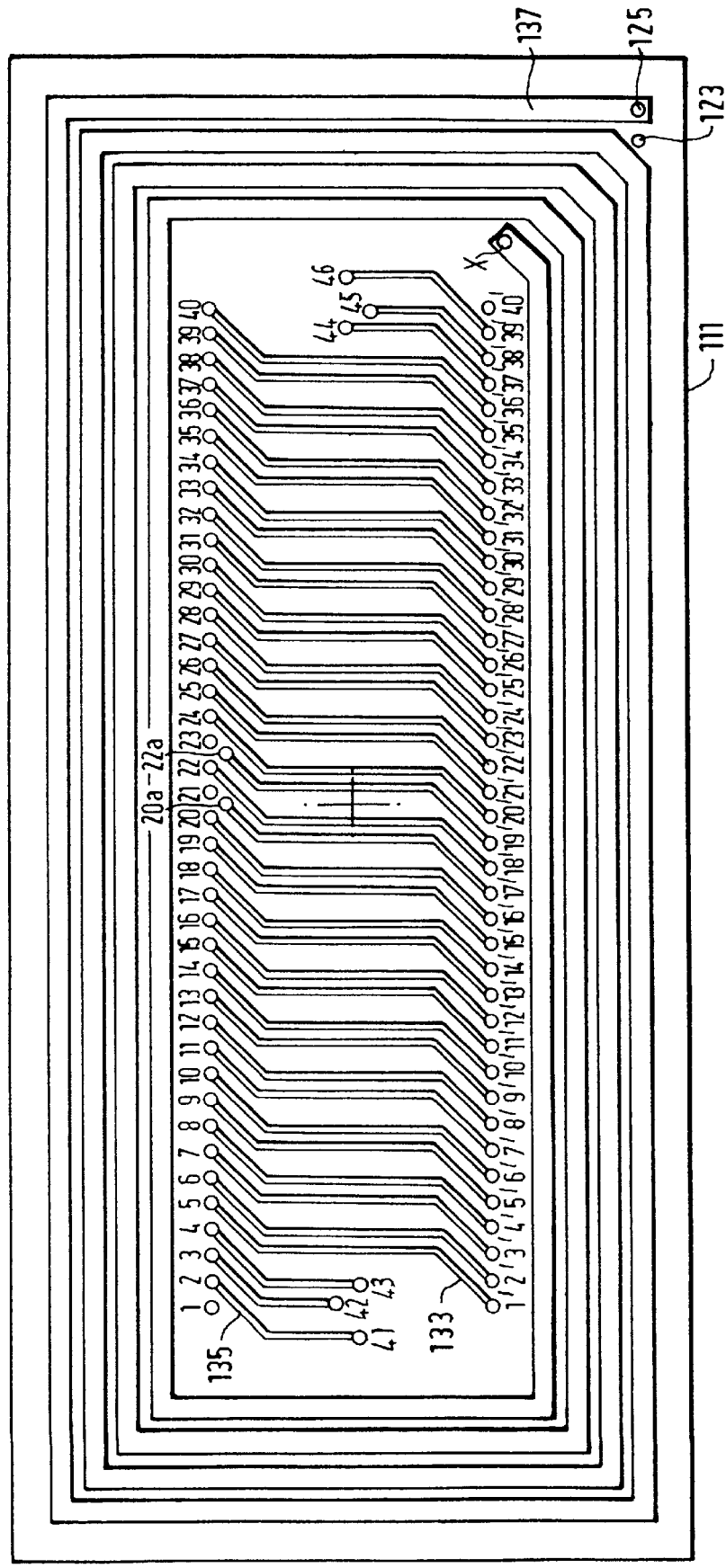

FIG. 4b shows the conductive patterns and the via holes on the top side of the printed circuit board, and FIG. 4c shows the conductive patterns and the via holes on the bottom of the printed circuit board (as viewed from the top side) which form the sensor head shown in FIG. 4a.

FIGS. 5a and 5b illustrate the form of each of the two pick-up windings 133 and 135 respectively. As shown in FIG. 5a, winding 133 comprises a number of hexagonally shaped loops of series connected conductors, connected such that adjacent loops are wound in the opposite sense. Pick-up winding 133 is such that two turns of conductors are provided for each loop except for the loops at each end, which only have one turn. In this embodiment, the repetition period of the loops is matched with the repetition period of the conductive screens so that the position of each screen within a period of pick-up winding 133 is substantially the same.

As shown in FIG. 5b, like pick-up winding 133, pick-up winding 135 also comprises a number of hexagonally shaped loops of series connected conductors, connected such that adjacent loops are wound in the opposite sense. As shown, pick-up winding 135 has two turns of conductor per loop and has the same total number of hexagonal shaped loops as pick-up winding 133. As shown in FIG. 5a and 5b, the mid-point (represented by the cross) of pick-up winding 133 is substantially the same as the mid-point of pick-up winding 135. Therefore, if the sensor head 111 tilts relative to the track 101, then the same proportion of each winding will be closer to the track and the same proportion of each winding will be further away from the track. Consequently, the signals output by each pick-up winding 133 and 135 will experience a similar amplitude change, which will be cancelled out by the ratio-metric calculation performed by the excitation and processing circuitry (not shown).

As can be seen from FIGS. 5a and 5b, pick-up winding 133 extends over a greater distance than pick-up winding 135. In order to compensate for this, the hexagonal shaped loop at each end of pick-up winding 133 is made less sensitive to magnetic field than the other loops of pick-up winding 133. In this embodiment, this is achieved by using only a single turn of conductor to define the end loops.

In this embodiment, the separation $d_1$ is made to be approximately half the separation $d_2$. This is to make the pick-up windings 133 and 135 less sensitive to some of the higher order harmonics of the opposing field created by the conductive screens 103 which are energised. This results from the current density which is induced in the pick-up windings by the opposing magnetic field.

Figure 6:
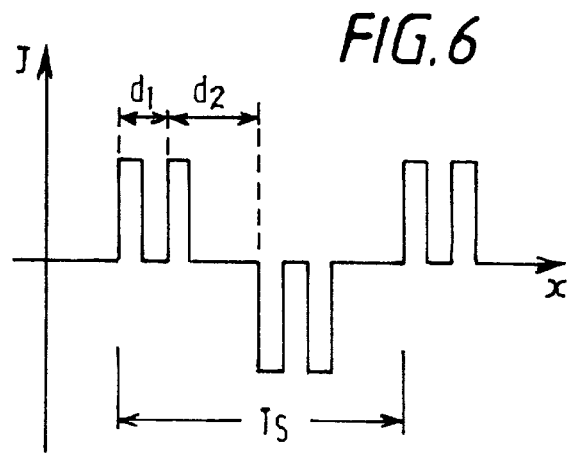

FIG. 6 shows a plot of the current density (J) flowing in the vertical limbs of one period of one of the pick-up windings shown in FIG. 5. From a Fourier analysis of the current density it can be shown that this current density can be generated by a fundamental having a period $T_s$ and higher order odd harmonics (the even harmonics are zero because of the symmetry). It can also be shown that with $d_2=2d_1$, the third harmonic content of the current density is approximately zero. As a result, the pick-up windings 133 and 135 are sensitive to magnetic fields which vary periodically along the length of the sensor head with a period $T_s$, but they are relatively insensitive to magnetic fields which vary periodically along the sensor head with a period $T_3/3$. The significance of this point will become apparent later.

Figure 7A:
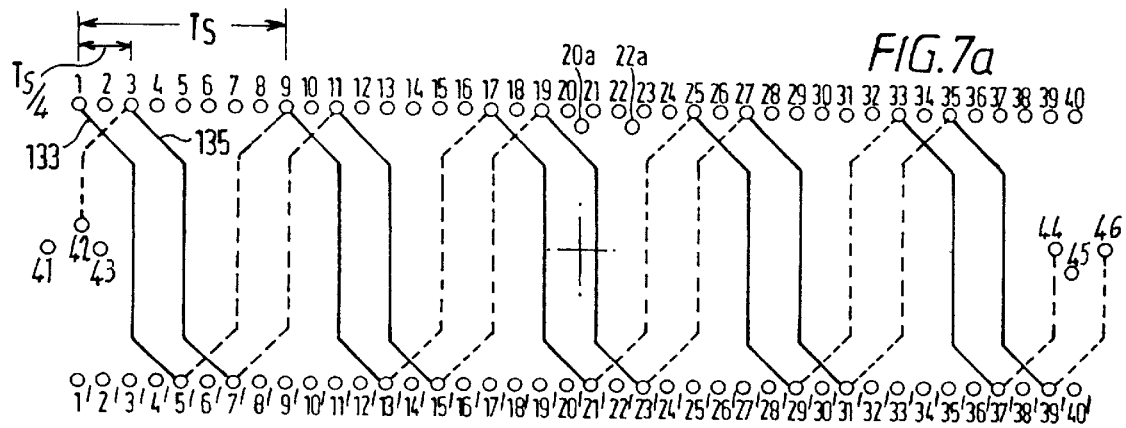

FIGS. 7a to 7d illustrate the way in which the multi-turn pick-up windings 133 and 135 are formed from a single conductor. The parts of the windings on the top layer of the printed circuit board are represented by full lines and those on the bottom layer are represented by broken lines. As shown in FIG. 7a pick-up winding 133 extends from via hole 1 in a generally sinusoidal manner to via hole 44 at the other end of the sensor head. Similarly, pick-up winding 135 extends from via hole 42 in a generally sinusoidal manner along the length of the sensor head to via hole 46. As shown, the period of each winding 133 and 135 is $T_s$ and winding 135 is spatially shifted by quarter of a period, i.e. $T_s/4$, relative to winding 133.

Figure 7B:
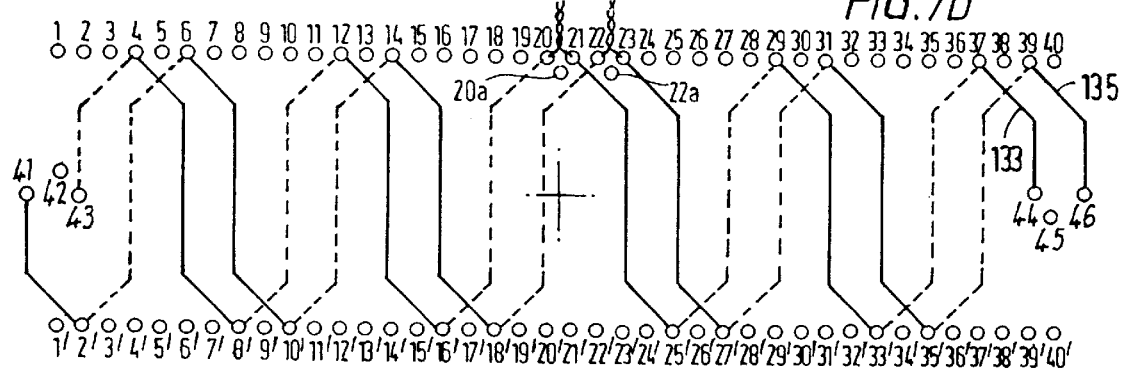

As shown in FIG. 7b, pick-up winding 133 extends back along the sensor head from via hole 44 again following the same generally sinusoidal path back to via hole 21 which is a connection point for connecting pick-up winding 133 to the excitation and processing circuitry (not shown). Pick-up winding 133 continues from the other connection point at via 20 along the sensor head in the same generally sinusoidal manner to via 43.

Similarly, pick-up winding 135 extends from via 44 back along the sensor head following the same generally sinusoidal pattern until it reaches the connection point at via 23. Pick-up winding 135 continues from the other connection point at via 22 along the sensor head in the same sinusoidal manner to via 41.

Figure 7C:
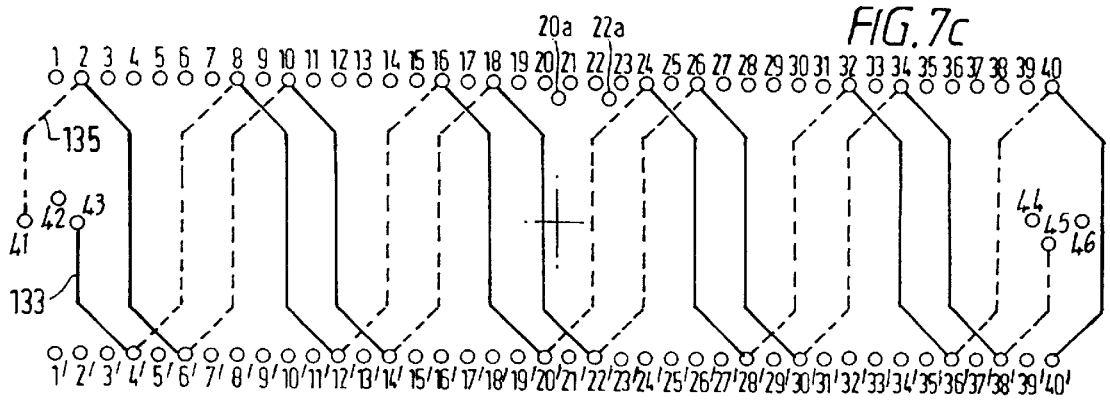
Figure 7D:
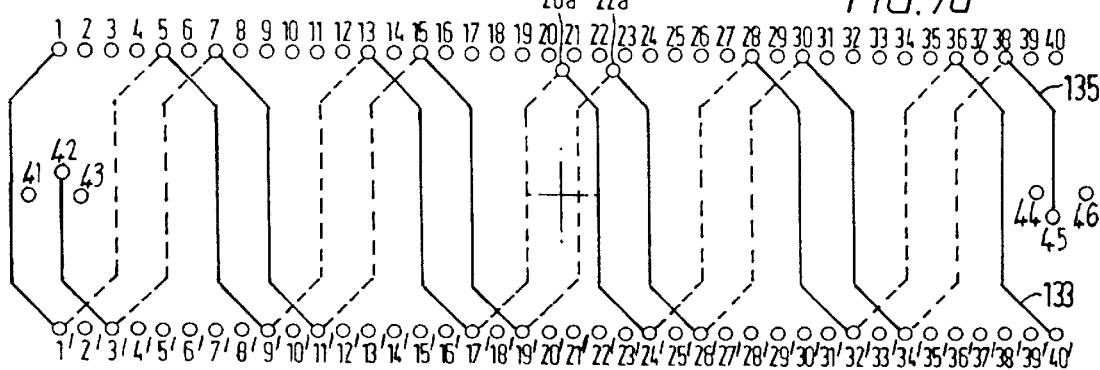

As shown in FIG. 7c, pick-up winding 133 extends from via 43 back along the length of the sensor head, again in the same generally sinusoidal manner to via 40'. Similarly pick-up winding 135 continues from via 41 and extends back along the sensor head to via 45, again in the same generally sinusoidal manner. As shown in FIG. 7d, the pick-up windings 133 and 135 extend from via holes 40' and 45 respectively back along the length of the sensor head to the starting points at via holes 1 and 42 respectively, as shown in FIG. 7a.

Figure 8A:
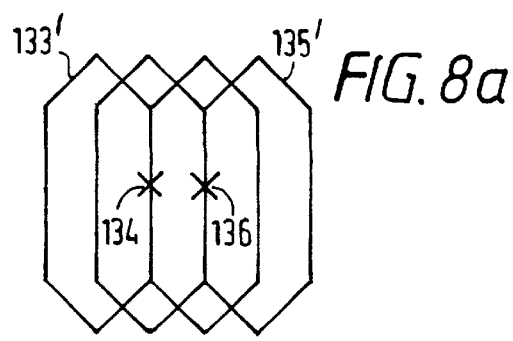
FIG. 8a schematically represents two sensor windings having different mid points.
Figure 8B:
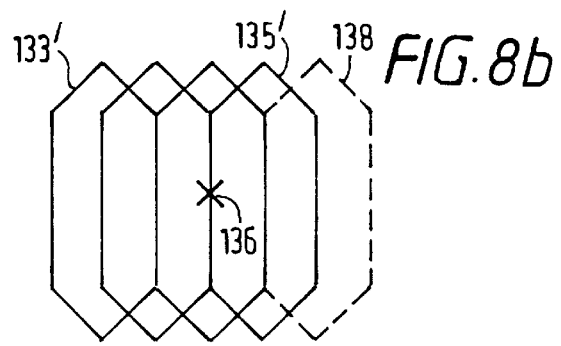
FIG. 8b schematically represents a modification to one of the sensor windings shown in FIG. 8a which makes both windings have the same mid point.

Essentially, the inventor has added an extra loop to the end of one of the windings in order to make their mid-points coincide. He has also added a second conductor to some of the loops so that the sensor head is still relatively immune to background electromagnetic interference and so that each winding encloses approximately the same area. To explain further, FIG. 8a schematically shows two sensor windings 133' and 135' having different mid points. Winding 133' has mid point 134 and winding 135' has mid point 136. FIG. 8b shows that by adding the additional loop 138 (shown in phantom) to the end of winding 133', that the effective mid point of winding 133' is now at point 136, ie. the same as that for winding 135'. Therefore, the windings shown in FIG. 8b will be less sensitive to longitudinal tilt relative to the track. However, by adding the additional loop 138 to the end of winding 133', it becomes sensitive to background electromagnetic interference since there are no longer the same number of loops wound in each sense.

Figure 8C:
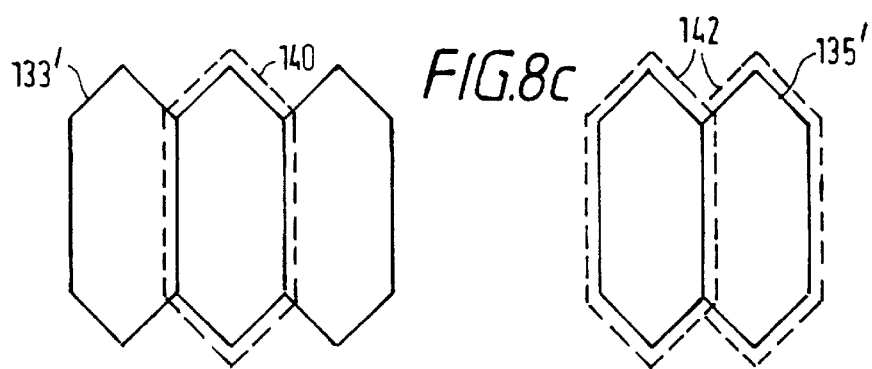
FIG. 8c schematically shows a modification to both windings shown in FIG. 8b so that both windings are balanced and enclose a similar area.

In order to overcome this imbalance, a second turn of conductor is provided for some of the loops in the windings 133' and 135'. In particular, as shown in FIG. 8c, winding 133' has a second turn of conductor, represented by the dashed loop 140, for the central loop and sense winding 135' has a second turn of conductor, represented by dashed loops 142, for both of its loops. The additional loops which are added are wound so that there are equal number of loops wound in each sense, ie. so that there is an equal numbers of loops wound clockwise and anticlockwise. The only difference between the windings 133' and 135' shown in FIG. 8c and those shown in FIGS. 5a and 5b is that in FIG. 8c the windings extend for only approximately one period, whereas in FIGS. 5a and 5b the windings 133 and 135 extend for approximately five periods. The multi-period design offers the advantages of increased signal strength and of averaging the signal over a number of periods which reduces errors due to defects in the manufacture of the windings and of the track.

In addition to the positional error in the output signal resulting from the tilt or pitch of the sensor head-111 shown in FIG. 1 relative to the track 101, another positional error arises in the output signal from each pick-up winding 103 and 105 if the sensor head 111 rolls about its longitudinal axis. This is because the conductors which form the pick-up windings are provided on two sides of a printed circuit board which has a finite thickness. Therefore, when the sensor head 111 rolls about its longitudinal axis, the cross-over points between the forward and return conduction paths change. This results in a perceived positional change along the x-axis of the sensor head 111 relative to the track-101.

The inventor has found that this positional error can be reduced by, for example, changing the phase of the conductive windings on each side of the printed circuit board approximately half-way along the sensor head 111. This results in the apparent positional change in the left hand side of the pick-up windings being opposite in sense to the apparent positional change in the right hand side. Therefore, the two positional changes cancel each other out. This positional error can also be minimised by reducing the thickness of the circuit board.

Figure 9A:
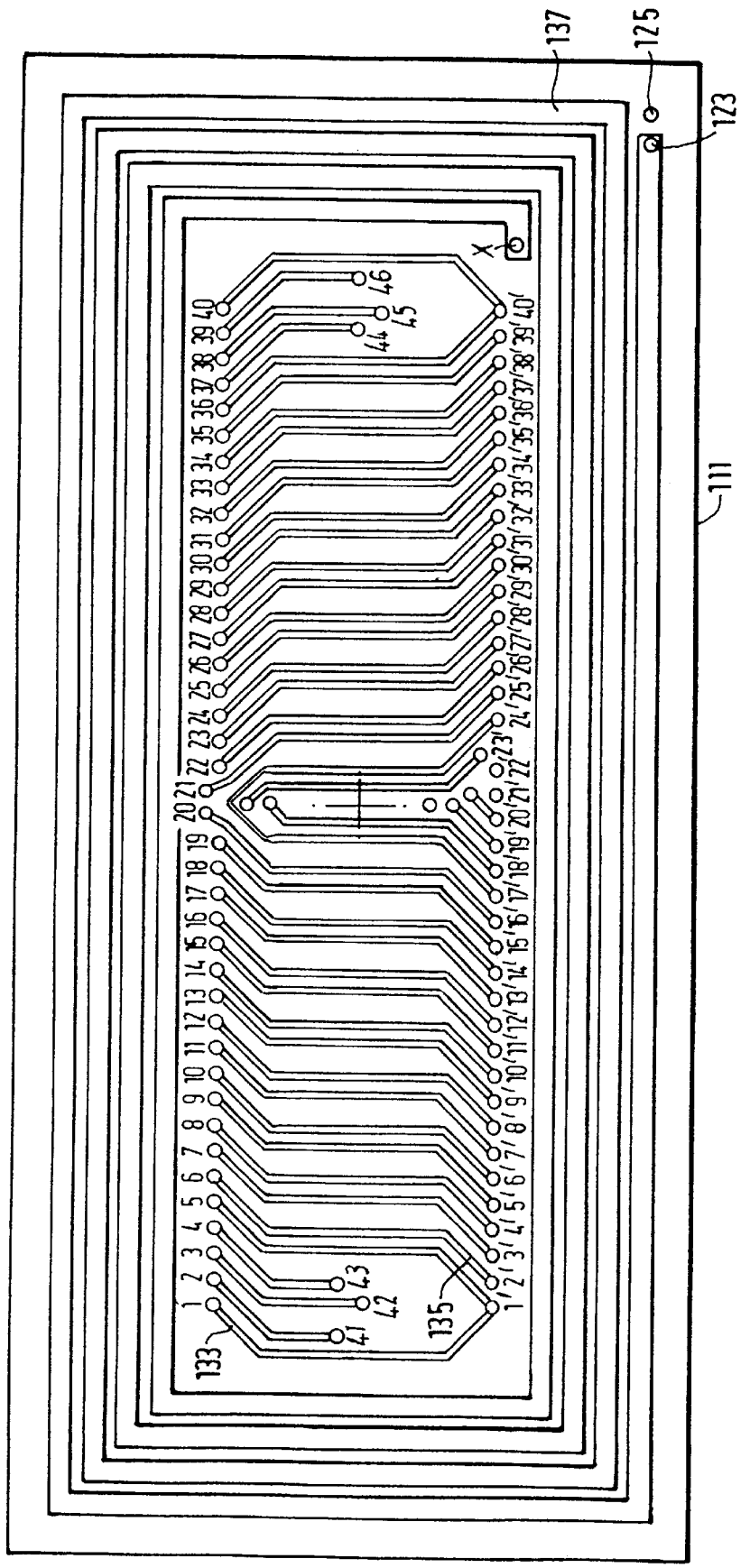
FIG. 9a illustrates a first layer of printed conductors which forms part of a sensor head according to a second embodiment.
Figure 9B:
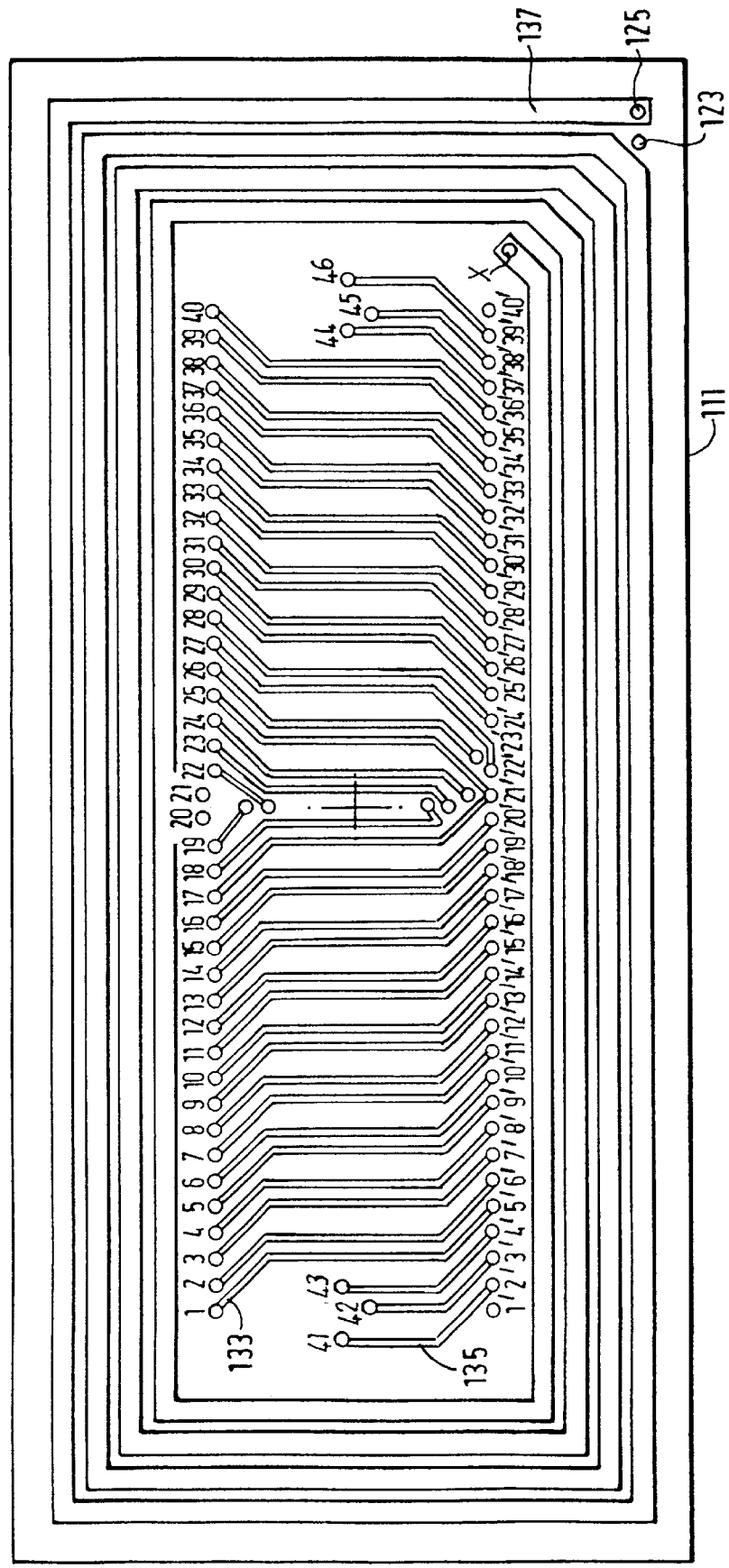

FIGS. 9a and 9b show the conductive patterns and the required via holes on the top and bottom layers of the printed circuit board respectively to achieve this phase shift for the pick-up windings 133 and 135 shown in FIG. 4a. As shown in FIG. 9a, the conductive patterns on the left-hand side of the sensor head 111 which were on the bottom layer of the printed circuit board shown in FIG. 4c, are now on the top layer. Similarly, as shown in FIG. 9b, the conductive patterns on the left-hand side of the sensor head 111 which were on the top layer of the printed circuit board shown in FIG. 4b, are now on the bottom layer. A similar compensation can be made by, for example, notionally splitting the windings into four quarters and by changing the phase every quarter.

Due to imperfections in the manufacturing process and the inability to construct a device having wires which cross over in the same plane and which are insulated from each other, positional errors still arise in the output signals due to tilt and roll of the sensor head 111 relative to the track. Some of these positional errors can be compensated for by the processing circuitry. FIG. 10 is a block diagram illustrating the processing circuitry used in the present embodiment. In particular, the processing circuitry 151 receives the signals 153 from the pick-up windings 133 and 135 as inputs, and these are fed to the demodulator 155 which outputs demodulated signals 157. The demodulated signals 157 are then processed by the compensation unit 159 which compensates for some errors which are inherent in the system. The compensated output signals 161 from the compensation unit 159 are then processed by the position calculation unit 163 which outputs 165 the position of the sensor head 111 relative to the track 101. Some of the corrections that the compensation unit 159 makes will now be described in more detail.

One form of error in the signals induced in the pick-up windings is caused by unwanted cross-coupling between the pick-up windings 133 and 135 and the excitation winding 137. This error is represented by a voltage offset (as illustrated in FIG. 2b) in the demodulated signals 157 output from the demodulator 155. In this embodiment, this offset is determined by suitable calibration, and is then subtracted from the output demodulated signals 157 by the compensation unit 159.

Another form of error arises when the pick-up windings 133 and 135 have slightly different sensitivities to the opposing fields generated by the conductive screens 103. The different sensitivities may arise because of differences between the areas enclosed by the two windings 133 and 135. To account for this error, the compensation unit applies a weighting to one of the measured output demodulated signals 157. Typically, if each pick-up winding has the same number of loops, then the weighting will be approximately 1±0.5% Additionally, a phase offset in the demodulated output signals may also be required if the two pick-up windings 133 and 135 are not exactly separated by $T_s/4$. This offset and weighting can also be determined through suitable calibration.

Another form of error which arises in the output signals is due to variations in the separation between the sensor head 111 and the track 101. The peak amplitude of the demodulated output signals decreases when the separation increases and increases when the separation decreases. Therefore, a suitable approximate correction value can be determined by taking a weighted value of the inverse of the peak amplitude of the output demodulated signals 157. The weighting used also compensates for changes in the cross coupling interference between the excitation and pick-up windings which will also change as the separation changes. Again, this weighting can be determined by suitable calibration. Since the demodulated output signals on the pick-up windings 133 and 135 are of the form $A\sin\theta$ and $A\cos\theta$ respectively (where A is the peak amplitude and $\theta$ is dependent upon the position), the peak amplitude (A) can be determined by squaring the demodulated output voltage from each pick-up winding, summing the squared values and taking the square root of the result. In this embodiment, the compensation unit 159 determines an appropriate correction value and subtracts this from the demodulated signals 157.

The inventor has established that without the above correction values, the output position is typically accurate to within 2% of the period $T_s$ when the head gap, i.e. the separation between the sensor head and the track, is between 1 mm and 2 mm. Whereas, using the correction values described above, over sensor head gaps of between 1 mm and 2 mm, with $T_s$ equal to 6 mm, accuracies of about 0.1% $T_s$ have been established. Additionally, the spatial resolution of the position encoder with these corrections has been demonstrated to be of the order of 0.001% $T_s$.

A number of modifications which can be made to the above embodiments will now be described with reference to FIGS. 11 to 14. FIG. 11 illustrates an alternative form of track 101, where the conductive screens 103 have a rectangular slit 171 in the middle. Preferably, the dimension $W_2$ shown in FIG. 11 should be greater than the separation between the via holes 1-40 and 1'-40' on the sensor head 111 shown in FIG. 4, as this reduces the coupling of the magnetic field generated by the current density on the horizontal limbs of each screen 103 with the windings 133 and 135 on the sensor head ill. The width $d_3$ of the slit 171 is preferably equal in size to the separation $d_4$ between adjacent conductive screens 22 and half the width of the vertical limbs 173 of the screens 103, in order to reduce spatial harmonic distortion. More specifically, when the conductive screens opposite the sensor head are energised by a current flowing in the excitation winding, a surface current density is generated on the screens which generates an opposing magnetic field which varies periodically with position along the track.

Figure 12A:
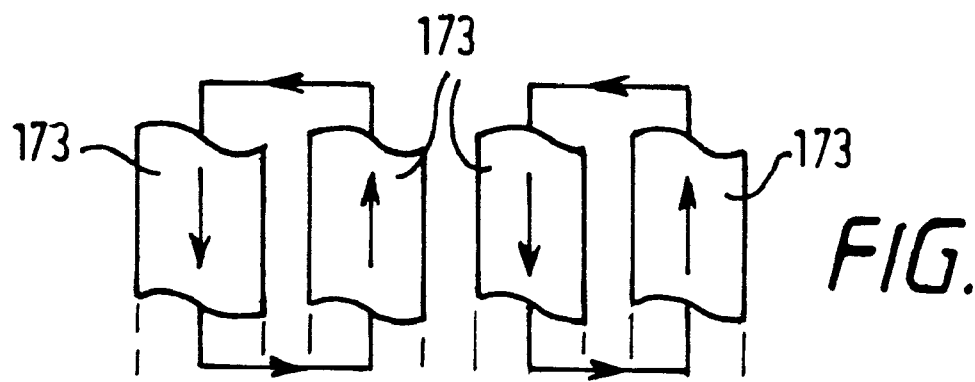
FIG. 12a schematically represents the surface current density flowing in the vertical limbs of two of the screens shown in FIG. 11.
Figure 12B:
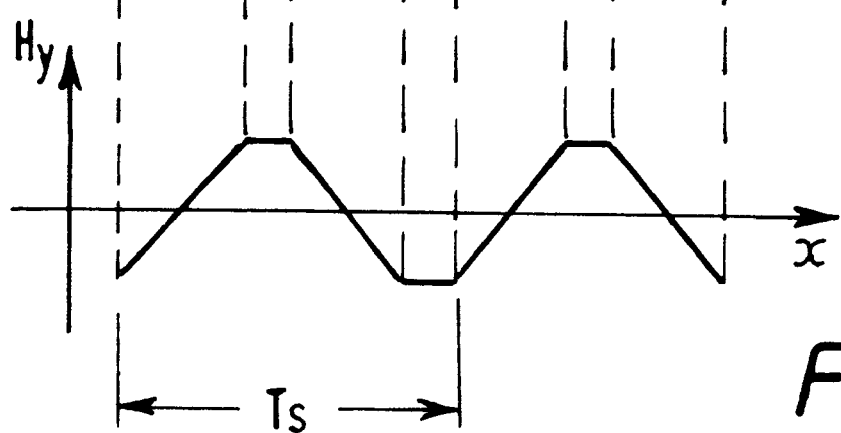

FIG. 12a shows the resultant current surface density flowing in the vertical limbs 173 of two adjacent conductive screens 103, ignoring the current density in the horizontal limbs. Since several adjacent conductive screens 103 are energised together, the opposing magnetic field ($H_y$) generated by the conductive screens 103 will be periodic and, at the surface of the screens 103, will have the form generally shown in FIG. 12b. It can be shown from a Fourier analysis of the signal shown in FIG. 12b, that this signal contains a fundamental component having a spatial period $T_s$ and higher order harmonics, and that by making $d_3$ and $d_4$ equal to ⅙ of the period $T_s$, there is no second or third harmonic content. The significance of this will now be explained.

The magnetic field generated by the conductive screens decays exponentially with distance from the surface of the screens. Since the higher order harmonics have a lower amplitude at the surface of the screens, these components die off more quickly than, for example, the fundamental component. Therefore, if the sensor head is operated at a distance of approximately 1 mm or 2 mm from the surface of the track, then most of the opposing magnetic field coupling with the pick-up windings 133 and 135 will be due to the lower order harmonics. However, by providing a rectangular slit 24 in the middle of the conductive screens with the dimensions described above, only the fundamental component of the opposing magnetic field will dominate at the surface of the sensor head 111.

This embodiment has a manufacturing cost equal to that of the first embodiment, when using printed circuit board construction techniques. Additionally, the input current to output voltage phase relationship will be similar to that of the first embodiment.

Figure 13A:
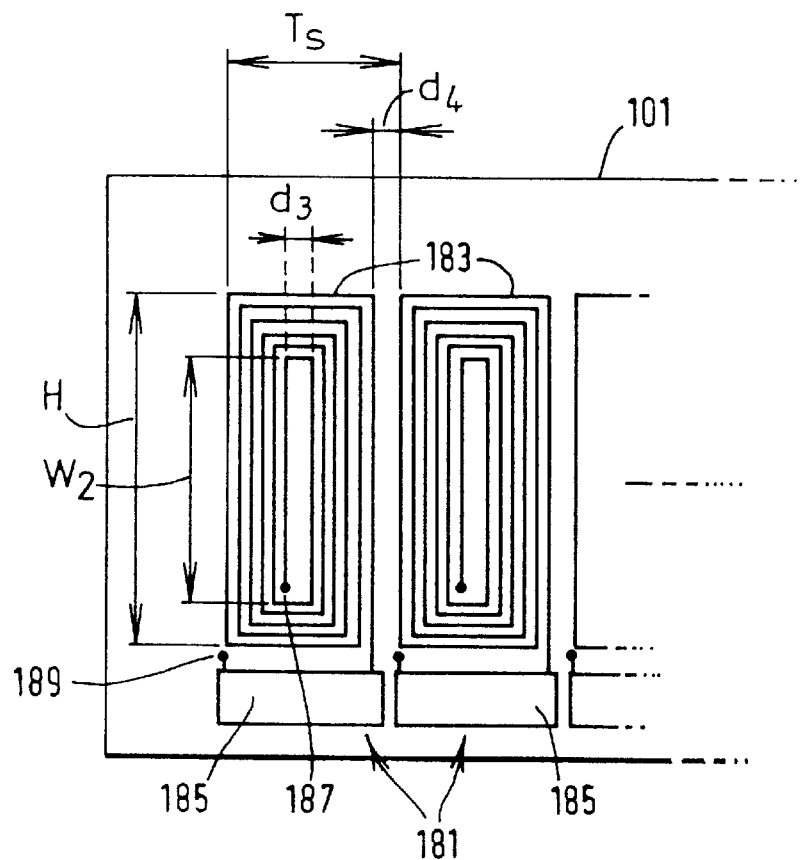
FIG. 13a shows the end of a track used in a positional encoder of a preferred embodiment, where the conductive screens are replaced by resonant circuits.

FIG. 13a illustrates a preferred form of track 101 where the conductive screens are replaced by resonant circuits 181. As in the first embodiment, the repetition period of the resonant circuits 181 is the same as the spatial period $T_s$ of the pick-up windings. By using resonant circuits 181, it is possible to use a pulse-echo mode of operation, whereby short bursts of excitation current are applied at the resonant frequency of the resonators 181, and the processing circuitry processes the signals induced in the pick-up windings after the excitation current has been removed. This mode of operation works because the resonators 181 continue to "ring" for a short period of time after the burst of excitation current has been removed. This mode of operation eliminates possible cross-coupling between the excitation windings and the pick-up windings.

As shown in FIG. 13a, each resonant circuit 181 of this embodiment comprises a coil 183 and a capacitor 185. One end of the coil 183 is connected to an end of the capacitor 185 and extends away from the capacitor following an anticlockwise reducing spiral path until it reaches the via hole 187. At via hole 187 the coil 183 passes through to the other side of the track 101 and continues in an enlarging spiral winding until it reaches via hole 189, where it passes back through the board and connects to the other end of the capacitor 185. In this embodiment the capacitor is a surface mount capacitor, using NPO dielectric with a value of 5.6 nF, which is mounted on one side of the printed circuit board having a thickness of approximately 0.4 mm. The dimension $W_2$ shown in FIG. 13a should be greater than the separation between opposing via holes 1-40 and 1'-40' shown in FIG. 4, as this reduces the unwanted effects of the current flowing in the horizontal conductors of the coils. In this embodiment, the separation between opposing via holes is 6 mm and the dimension $W_2$ is 8 mm. The height H of the coil 183 in this embodiment, is 13 mm. As in the embodiment shown in FIG. 11, the widths $d_3$ and $d_4$ are preferably equal to approximately ⅙ of the period $T_s$, as this reduces the unwanted 2nd and 3rd spatial harmonics of the magnetic field produced by the resonators 181.

Figure 13B:
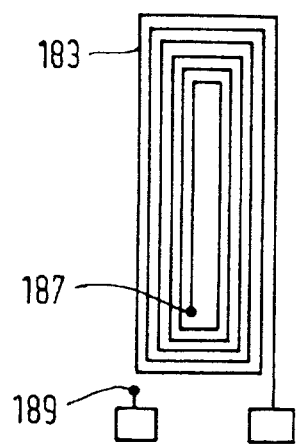
Figure 13C:
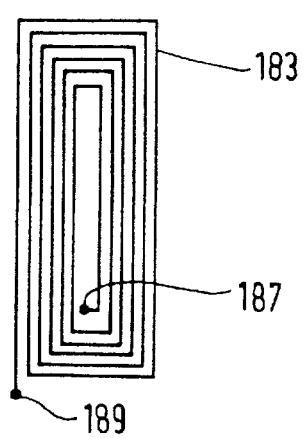

FIG. 13b, the top copper layer, shows the reducing anticlockwise spiral winding of coil 183. FIG. 13c, the bottom copper layer (as viewed from the top copper layer), shows the enlarging anticlockwise spiral winding of coil 183.

As is well known in the art, the Q of a resonant circuit is dependent upon the area of copper which forms the coil, for a given copper foil thickness. The use of a multi-turn coil on both sides of he track 101 is consistent with maintaining a high Q and reasonable impedance levels. Preferably, high stability capacitors are used with the multi-turn coils 183 in the resonator design. Embodiments with one or two turns are envisaged, but capacitors having the required values and stability are not manufactured presently.

In the resonator embodiment, with a typical drive current of approximately 100 mA, at a frequency of approximately 1 MHz, and with a separation between the sensor head 111 and the track 101 of approximately 1 mm, the voltage induced in the pick-up windings will be approximately 100 mV rms. However, as the separation increases, the output voltage reduces exponentially. For example, at a separation of 2 mm the voltage output from the pick-up windings is approximately 30 mV rms.

As mentioned above, the advantage of using resonant circuits as the passive elements on the track 101, is that the system can be operated in a pulse-echo mode of operation. However, since the impedance of the resonant circuits 181 at resonance is purely resistive, there is a well defined phase relationship between the excitation current and the voltage induced in the pick-up windings. Therefore, even if the excitation current is continuously applied to the excitation winding, the processing circuitry (not shown) will be able to differentiate between the signals induced in the pick-up windings by the resonators from the signal induced in the pick-up windings by the excitation winding. In particular, when resonant circuits are used, the phase of the synchronous detector is set to give the minimum cross-coupling offset error.

FIG. 14 illustrates an alternative embodiment, where the track 101 carries a plurality of short circuit coils 183 in place of the conductive screens 103. Again, the repetition period of the short circuit coils 183 is set to be equal to the spatial period $T_s$ of the pick-up windings. This embodiment operates in a similar manner to the embodiment described above with reference to FIG. 11. This embodiment is slightly cheaper to implement than the resonant circuit embodiment as there is no capacitor. The dimensions of the coils 183 in this embodiment are the same as those of the coils shown in FIG. 13a.

Although sinusoidal and hexagonal shaped pick-up windings have been shown in the drawings, alternative geometries or patterns of conductors could be used. For example, square-wave or triangular-wave windings and any other three piecewise linear approximations.

Although two-phase quadrature pick-up windings have been employed on the sensor head 111, in the above embodiments, a sensor head employing three, four or any number of suitably shifted pick-up windings could be used. For example, three pick-up windings could be provided on the sensor head, each spatially separated from the other by $T_s/6$.

The operating frequency of the encoder is mainly determined by physical size and the required circuit impedances. Typically, the operating frequency ranges from 10 KHz to 10 MHz, with 300 KHz being optimal for the six millimeter pitch pick-up windings and conductive screens. The optimum operating frequency when resonators are used is dependent upon the resonator Q, but will typically be about 1 MHz. In the resonator design, the required circuit impedance can be obtained by using series or parallel connected resonating capacitors if required. Alternatively, impedance electrical transformers can be utilised which have the added advantages of introducing galvanic isolation, suppressing common mode interference signals and improving the power efficiency of the sensor.

The inventor believes that by using these correcting techniques, it is possible to scale the device over a very large range of pick-up winding period $T_s$. For example, it is envisaged that the sensor head could be implemented on silicon. In this case, it would be possible to implement the entire sensor head including the processing circuitry, on a single integrated circuit chip.

Furthermore, it is possible to shield the position encoder system from surrounding electromagnetic interference, thereby allowing the device to be used in electromagnetically hostile environments. In addition, the system is not adversely affected if a steel backing plate is provided behind the track 101 and/or if a thin stainless steel (i.e. non-magnetic) layer is placed over the track. However, when such a stainless steel cover is used, the operating frequency must be sufficiently high to make the stainless steel seem transparent to the generated magnetic fields. Therefore, the system can be used in a wide variety of applications, including high accuracy industrial applications, such as machine tool position sensing.

It is also envisaged that the track 101 could be formed into a circular ring, thereby providing a rotary position sensor.

The present invention is not intended to be limited by the exemplary embodiments described above, and various other modifications and embodiments will be apparent to those skilled in the art.

What is claimed is:

1. A position detector including:
    first and second members mounted for relative movement in a measurement direction;
    said first member comprising a sensor having first and second sensing means, each comprising a plurality of loops of conductor, arranged in succession in said measurement direction, wherein
    i) the loops of the respective sensing means extend along said path and are connected in series with each other and arranged so that EMFs induced in adjacent loops by a common background alternating magnetic field oppose each other;
    ii) the loops of said first and second sensing means are offset from each other in the measurement direction;
    iii) the extent of each of said loops in said measurement direction is substantially the same; and
    iv) the loops of the respective sensing means are arranged such that the midpoints of the plurality of loops of conductor of the first and second sensing means, in the measurement direction, substantially coincide;
    said second member comprising a plurality of equally spaced magnetic field generators each for generating a magnetic field, said magnetic field generators extending along said measurement direction with a repetition period in said measurement direction that is substantially equal to twice the extent of said conductor loops in the measurement direction; and
    wherein the magnetic fields generated by the magnetic field generators adjacent said sensor induce, in each of said sensing means, a signal whose amplitude varies with the position of the sensor relative to the magnetic field generators in the measurement direction, the amplitude of the signal induced in the first sensing means being different from the amplitude of the signal induced in the second sensing means for a given relative position between the magnetic field generators and the sensor, due to the offset between the loops of the first and second sensing means in the measurement direction.

2. A detector according to claim 1, wherein the plurality of loops of conductor of each sensing means are generally symmetric about a transverse reflection plane which passes through said mid point.

3. A detector according to claim 1, wherein the plurality of loops of conductor of each sensing means are arranged to enclose a similar area.

4. A detector according to claim 1, wherein each sensing means comprises the same number of series connected loops of conductor, and wherein one of the plurality of loops of conductor extends over a greater distance in the measurement direction than the other.

5. A detector according to claim 4, wherein the loops at each end of the longer plurality of loops are arranged to have a reduced sensitivity to magnetic field than the sensitivity to magnetic field of the other loops.

6. A detector according to claim 5, wherein more turns of conductor are provided for defining said other loops than the number of turns of conductor used for defining said end loops, thereby causing the sensitivity to magnetic field of said end loops to be reduced relative to the sensitivity to magnetic field of said other loops.

7. A detector according to claim 6, wherein two turns of conductor are used-to define said other loops and a single turn of conductor is used to define said end loops.

8. A detector according to claim 6, wherein the spacing between the turns of each conductor is arranged to reduce the sensitivity of each conductor to magnetic fields which vary periodically in the measurement direction with a period which is two thirds of the extent of said loops in said measurement direction.

9. A detector according to claim 1, wherein connections to each of said plurality of loops of conductor are provided in the vicinity of said mid point.

10. A detector according to claim 1, wherein the loops of said first and second sensing means have a generally hexagonal shape.

11. A detector according to claim 1, wherein the loops of said first and second sensing means have a generally square shape.

12. A detector according to claim 1, wherein the loops of said first and second sensing means are derived from opposed sinusoidal convolutions of conductor.

13. A detector according to claim 1, wherein the loops of each sensing means are carried on a substantially planar surface.

14. A detector according to claim 13, wherein the loops of the first and second sensing means are electrically separated from each other, and formed one on top of the other.

15. A detector according to claim 1, wherein the loops of said first and second sensing means are offset from each other in the measurement direction by half the extent of said loops.

16. A detector according to claim 1, wherein each sensing means comprises more than two of said loops which extend successively in said measurement direction.

17. A detector according to claim 16, wherein each sensing means comprises approximately ten of said loops. which extend in said measurement direction.

18. A detector according to claim 1, wherein the extent of each of said loops is approximately 3 mm.

19. A detector according to claim 1, wherein the loops of each sensing means are defined by a plurality of interconnected conductive patterns on a plurality of layers of a printed circuit board.

20. A detector according to claim 19, wherein the loops of each sensing means are defined by two repetitive complementary conductive patterns, each repetitive pattern being formed on a respective side of a printed circuit board.

21. A detector according to claim 19, wherein the loops of each sensing means are defined by two repetitive complementary conductive patterns on two sides of a printed circuit board, and wherein each side of the printed circuit board carries a portion of each repetitive pattern.

22. A detector according to claim 21, wherein each side of the printed circuit board carries half of each repetitive pattern.

23. A detector according to claim 1, comprising an excitation circuit mounted for movement with said sensor relative to said magnetic field generators, which excitation circuit is operable for generating an energizing signal in the vicinity of said sensor and wherein each of said magnetic field generators is operable to generate a magnetic field when energized by the energizing signal generated by said excitation circuit.

24. A detector according to claim 23, wherein said excitation circuit comprises a plurality of conductive windings which extend around the periphery of the loops of conductor of said first and second sensing means.

25. A detector according to claim 1, wherein each of said first and second sensing means are arranged to be substantially insensitive to induction of signals by an alternating magnetic field of uniform strength along the measurement direction.

26. A detector according to claim 1, wherein each magnetic field generator comprises a conductive screen.

27. A detector according to claim 1, wherein each magnetic field generator comprises a resonant circuit.

28. A detector according to claim 27, wherein each resonant circuit comprises a coil and a capacitor.

29. A detector according to claim 1, wherein each magnetic field generator comprises a short circuit coil.

30. A detector according to claim 29, wherein said short circuit coil comprises a single turn of conductor.

31. A detector according to claim 1, wherein the arrangement of the magnetic field generators is such that the combined magnetic field generated by them contains little or no field components which periodically vary in the measurement direction with a period which is two thirds that of the extent of the loops of conductor.

32. A detector according to claim 1, comprising processing circuitry which is operable for processing the signals induced in said first and second sensing means, and which is operable for providing an output indicative of the relative position of the sensor and the magnetic field generators.

33. A detector according to claim 32, wherein said processing circuitry comprises a synchronous detector which is operable for demodulating the signals induced in said first and second sensing means.

34. A detector according to claim 33, wherein the synchronous detector is arranged to minimise any interference caused by the excitation signal.

35. A detector according to claim 33, wherein the synchronous detector is arranged to provide the maximum output signal levels.

36. A detector according to claim 33, wherein said processing circuitry is arranged to subtract an offset from the demodulated signals in order to compensate for interference caused by the excitation signal.

37. A detector according to claim 33, wherein the processing circuitry is arranged to apply a weighting to the demodulated output signal from each of said first and second conductors to compensate for different sensitivities to magnetic field of each of said first and second sensing means.

38. A detector according to claim 33, wherein said processing circuitry is arranged to provide a phase offset in the demodulated output signals from said first and second sensing means, in order to compensate for errors which arise because the loops of conductors of the first and second sensing means are not offset in said measurement direction by the required amount.

39. A detector according to claim 33, wherein the processing circuitry is arranged to subtract a second offset from the demodulated output signals from said first and second conductors, in order to compensate for variations in separation between the sensor and the plurality of magnetic field generators.

40. A detector according to claim 39, wherein the second offset value is dependent upon the inverse of the peak amplitude of the measured demodulated output signals from the first and second sensing means.

41. A detector according to claim 33, wherein said processing circuitry is arranged to determine a ratio of the demodulated signals from said first and second sensing means to provide said output indicative of the relative position of the sensor and the magnetic field generators.

42. A sensor for use in a position detector according to claim 1, comprising:
   first and second sensing means, each comprising a plurality of loops of conductor extending in a measurement direction, wherein
   i) the loops of the respective sensing means are connected in series to each other and arranged so that any emf induced in one of said loops by an alternating magnetic field of uniform strength is opposed by the emf induced in an adjacent connected loop by the same magnetic field;
   ii) the loops of said first and second sensing means are offset from each other in the measurement direction;
   iii) the extent of each of said loops in said measurement direction is substantially the same; and
   iv) the loops of the respective sensing means are arranged such that the midpoints of the plurality of loops of conductor of the first and second sensing means, in the measurement direction, substantially coincide.

43. Use of a sensor according to claim 42, in an apparatus for indicating the position of first and second relatively movable members.

44. (Amended) A method of determining the relative position of first and second relatively movable members using a detector according to claim 1, comprising the steps of:

providing said sensor on said first member and said plurality of magnetic field generators on said second member;

generating magnetic fields from magnetic field generators in the vicinity of said sensor; and detecting the output signals produced in response thereto in said sensor and deriving therefrom the relative positions of said first-and second relatively movable members.

45. A method according to claim 44, wherein said second member is fixed.

46. A method according to claim 44, wherein the magnetic field generated by said magnetic field generators is an alternating magnetic field having a frequency in the range of 10 KHz to 10 MHz.

47. A method according to claim 44, wherein said magnetic field generators generate a magnetic field during a first time interval and wherein said output signals are detected during a subsequent second time interval after said first time interval.

48. A position detector comprising:

first and second members mounted for relative movement in a measurement direction;

said first member comprising an excitation circuit and a sensor, the sensor having first and second sensing means, each comprising a plurality of loops of conductor arranged in succession in said measurement direction, wherein (i) the loops of the respective sensing means extend along said path and are connected in series with each other and are arranged so that EMFS induced in adjacent loops by a common background alternating magnetic field oppose each other;

(ii) the loops of said first and second sensing means are offset from each other in the measurement direction;

(iii) the extent of each of said loops in said measurement direction is substantially the same;

(iv) the loops of the respective sensing means are arranged such that the midpoints of the plurality of loops of conductor of the first and second sensing means, in the measurement direction, substantially coincide; and (v) said excitation circuit is operable to generate an energising signal in the vicinity of said sensor;

said second member comprising a plurality of equally spaced magnetic field generators extending along said measurement direction, wherein (i) the repetition period of said magnetic field generators in said measurement direction is substantially equal to twice the extent of said conductor loops in the measurement direction; and (ii) each of said magnetic field generators is operable to generate a magnetic field when energised by the energising signal generated by said excitation circuit, which magnetic field is operable to induce, in each of said sensing means, a signal which varies with the position of the sensor relative to the magnetic field generators in the measurement direction, from which the relative position of said first and second members can be determined.

49. A position detector including:

first and second members mounted for relative movement in a measurement direction;

said first member comprising a sensor having first and second sensor windings, each comprising a plurality of loops of conductor arranged in succession in said measurement direction, wherein i) the loops of the respective sensor windings extend along said path and are connected in series with each other and arranged so that EMFs induced in adjacent loops by a common background alternating magnetic field oppose each other;

ii) the loops of said first and second sensor windings are offset from each other in the measurement direction;

iii) the extent of each of said loops in said measurement direction is substantially the same; and iv) the loops of the respective sensor windings are arranged such that the midpoints of the plurality of loops of conductor of the first and second sensor windings, in the measurement direction, substantially coincide;

said second member comprising a plurality of equally spaced magnetic field generators, said magnetic field generators extending along said measurement direction with a repetition period, in said measurement direction, that is substantially equal to twice the extent of said conductor loops in the measurement direction; and wherein the arrangement is such that magnetic fields generated by magnetic field generators in the vicinity of said sensor induce, in each of said sensor windings, a signal that varies with the position of the sensor relative to the magnetic field generators, from which the relative position of said first and second members can be determined.

50. A position detector comprising:

first and second relatively movable members:

one of said members includes a sensor head and the other of said members includes a plurality of spaced magnetic field generators;

said sensor head including loops of conductor in respective first and second sensing circuits arranged such that midpoints of the plurality of loops of conductor of said first and second sensing circuits, in a measurement direction, substantially coincide, thereby providing a detector which is less sensitive to longitudinal tilt of the sensor head member relative to the other member.

* * * * *